(12) United States Patent
Chua (10) Patent No.: US 11,393,172 B2
(45) Date of Patent: Jul. 19, 2022

(54) INTERACTIVE PRINTED PUBLICATION (71) Applicants: Robert Wah-Peng Chua, Hong Kong (HK); ROBERT CHUA PRODUCTION HOUSE CO. LTD., Hong Kong (HK)

(72) Inventor: Robert Wah-Peng Chua, Hong Kong (HK)

(*) Notice: Subject to any disclaimer, the term of this patent is extended or adjusted under 35 U.S.C. 154(b) by 98 days.

(21) Appl. No.: 16/955,695

(22) PCT Filed: Nov. 30, 2018

(86) PCT No.: PCT/SG2018/050589
§ 371 (c)(1),
(2) Date: Jun. 18, 2020

(87) PCT Pub. No.: WO2019/125303
PCT Pub. Date: Jun. 27, 2019

(65) Prior Publication Data
US 2020/0312041 A1 Oct. 1, 2020

(30) Foreign Application Priority Data
Dec. 19, 2017 (SG) ............... 10201710542U (51) Int. Cl.
*G06T 19/00* (2011.01)
*G06K 19/06* (2006.01)
*G06T 11/00* (2006.01)

(52) U.S. Cl.
CPC ...... *G06T 19/006* (2013.01); *G06K 19/06028* (2013.01); *G06K 19/06037* (2013.01); *G06T 11/00* (2013.01); *G06T 2200/24* (2013.01)

(58) Field of Classification Search
CPC .................................................. G06T 19/006
See application file for complete search history.

(56) References Cited

U.S. PATENT DOCUMENTS

2014/0079374 A1* 3/2014 Gehring ........... H04N 21/47214
386/296
2017/0352187 A1* 12/2017 Haines ................... G06F 16/48

* cited by examiner

*Primary Examiner* — Shivang I Patel
(74) *Attorney, Agent, or Firm* — Sinorica LLC (57) ABSTRACT

Described herein is an interactive printed publication comprising a plurality of content segments printed thereon and a plurality of machine readable codes printed thereon. Each of the plurality of machine readable codes is associated with and positioned adjacent at least one of the plurality of content segments and each of the plurality of machine readable codes containing data being extractable by a computing device when being read thereby for initiating communication between the computing device and a computing system.

15 Claims, 5 Drawing Sheets

INTERACTIVE PRINTED PUBLICATION

TECHNICAL FIELD

This invention relates generally to an interactive printed publication and a system and a method for content delivery there via.

BACKGROUND

Contemporary printed publications, for example books and pamphlets, have limited interactivity. Publishers, even for self-published articles and books, usually include an email address, a webpage address or a social media address, for example a facebook address, to enable feedbacks or comments to be sent by a reader of a publication. However, an emotion or thought triggered during consumption of specific parts of the publication may wane or change when the reader pauses or waits until the end of, for example a book, is reached before the reader is able to craft his comments for sending to the publisher or author of the publication. Further, comments provided in such a manner are not usually directed at particular parts of the publication unless the reader zealously takes notes of his thoughts and the parts of the publication the thoughts corresponds with during consumption of the publication. Additionally, a reader may wish to find out more about particular parts of the publication which requires the reader to pause and turn to Google or YouTube to find the required info, not knowing where the best information and content may be found. Therefore, there exists a need for a publication and content communication approach for addressing the foregoing problems.

SUMMARY

In accordance with a first aspect of the invention, there is disclosed an interactive printed publication comprising a plurality of content segments printed thereon and a plurality of machine readable codes printed thereon. Each of the plurality of machine readable codes is associated with and positioned adjacent at least one of the plurality of content segments and each of the plurality of machine readable codes containing data being extractable by a computing device when being read thereby for initiating communication between the computing device and a computing system.

In accordance with a second aspect of the invention, there is disclosed a content communication method comprising providing a printed publication comprising a plurality of content segments printed thereon and a plurality of machine readable codes printed thereon. Each of the plurality of machine readable codes is associated with and positioned adjacent at least one of the plurality of content segments and each of the plurality of machine readable codes containing data being extractable by a computing device when being read thereby. The content communication method further comprises reading one of the plurality of machine readable codes for extracting data therefrom for initiating communication between the computing device and a computing system therewith.

In accordance with a third aspect of the invention, there is disclosed a content communication system comprising an interactive printed publication comprising a plurality of content segments printed thereon and a plurality of machine readable codes printed thereon. Each of the plurality of machine readable codes being associated with and positioned adjacent at least one of the plurality of content segments. The content communication system further comprises a computing device for reading and extracting data from a selected one of the plurality of machine readable codes to thereby initiate communication between the computing device and a computing system.

DETAILED DESCRIPTION

An exemplary embodiment of the present invention, an interactive printed publication 20 utilising a content communication method 100 for enabling a content communication system 200 is described hereinafter with reference to FIG. 1 to FIG. 8.

Figure 3:
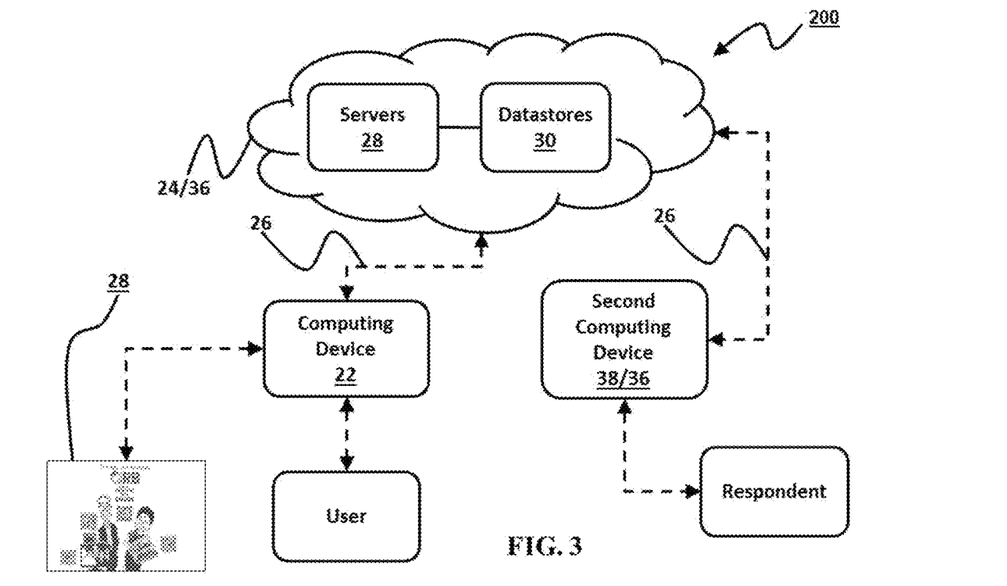
FIG. 3 shows a partial system diagram of a content communication system according to a further aspect of the invention comprising the interactive printed publication of FIG. 1, an exemplary computing device, a control computer system functioning as a computing system and a second computing device functioning as the computing system.

FIG. 3 depicts an exemplary system architecture of the content communication system 200 that can execute implementations of the present disclosure. The content communication system 200 can include a computing device 22 associated with a user and a control computer systems 24. The computing device 22 can communicate with one or more of the control computer systems 24 over a network 26.

The control computer systems 24 can each include one or more servers 28 and one or more datastores 30, respectively. In some implementations, the content communication system 200 may represent a client/server system supporting multiple computer systems (e.g., control computer systems 26) including one or more clients that are connectively coupled for communication with one another over the network 26.

The computing device 22 can represent various forms of processing devices including, but not limited to, a desktop computer, a laptop computer, a handheld computer, a personal digital assistant (PDA), a notebook computer, a smartphone, a smart tablet, a cellular telephone, a network appliance, a camera, a smart phone, a smart device, a smart tablet, an enhanced general packet radio service (EGPRS) mobile phone, a media player, a navigation device, an email device, a game console, or a combination of any two or more of these data processing devices or other data processing devices. The computing device 22 may access application software on one or more of the control computer systems 24. It is highly preferable that the computing device 22 has an integrated image capture means, for example a camera, or can be paired, adapted or data, communicated with an image capture device, for example a camera or another smart device with a built-in camera.

The control computer systems 26 can represent various forms of server systems including, but not limited to a web server, an application server, a proxy server, a network server, or a server farm. For example, one or more of the servers 28 can be an application server that executes software accessed by the computing device 22. In some implementations, a user can invoke applications available on one or more of the servers 28 in a web browser or a mobile application running on a client (e.g. computing device 22).

In some implementations, the computing device 22 may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA). CDMA2000, or General Packet Radio System (GPRS), among others. For example, the communication may occur through a radio-frequency transceiver (not shown). In addition, short-range communication may occur, such as using a Bluetooth, WiFi, or other such transceiver.

The network 26 can be a large computer network, such as a local area network (LAN), wide area network (WAN), the Internet, a cellular network, or a combination thereof connecting any number of mobile clients, fixed clients, and/or servers. In some implementations, each client (e.g., computing device 22) can communicate with one or more of the control computer systems 26 via a virtual private network (VPN), Secure Shell (SSH) tunnel, or other secure network connection. In some implementations, the network 30 can include the Internet, a wireless service network and may include the Public Switched Telephone Network (PSTN). In other implementations, the network 30 may include a corporate network (e.g., an intranet) and one or more wireless access points.

The computing device 22 can establish its own session with the control computer systems 26. Each session can involve two-way information exchange between the control computer systems 24 and the computing device 22. For example, a Hypertext Transfer Protocol (HTTP) session can allow the association of information with individual users. A session can be stateful session, in which at least one of the communicating parts (e.g., the control computer systems 24 or the computing device 22) stores information about the session history in order to be able to communicate. Alternatively, stateless communication during a stateless session includes independent requests with associated responses.

In an implementation of the invention as shown in FIG. 1 and FIG. 4 to FIG. 8, the interactive printed publication 20 comprises a plurality of content segments 32 printed thereon and a plurality of machine readable codes 34 printed thereon. Each of the plurality of machine readable codes 34 is associated with and positioned adjacent at least one of the plurality of content segments 32. Each of the plurality of machine readable codes 34 contains data being extractable by the computing device when being read thereby for initiating communication between the computing device 22 and a computing system 36. The computing system 36 is preferably the control computer system 24 or the like system where content or data is to be derived from, provided to or communicated. In addition or alternatively, the computing system 36 is another computing device, also referred to as a second computing device 38 for clarity sake, with which the computing device 22 communicates content or data directly, or via the control computer system 24.

Figure 1:
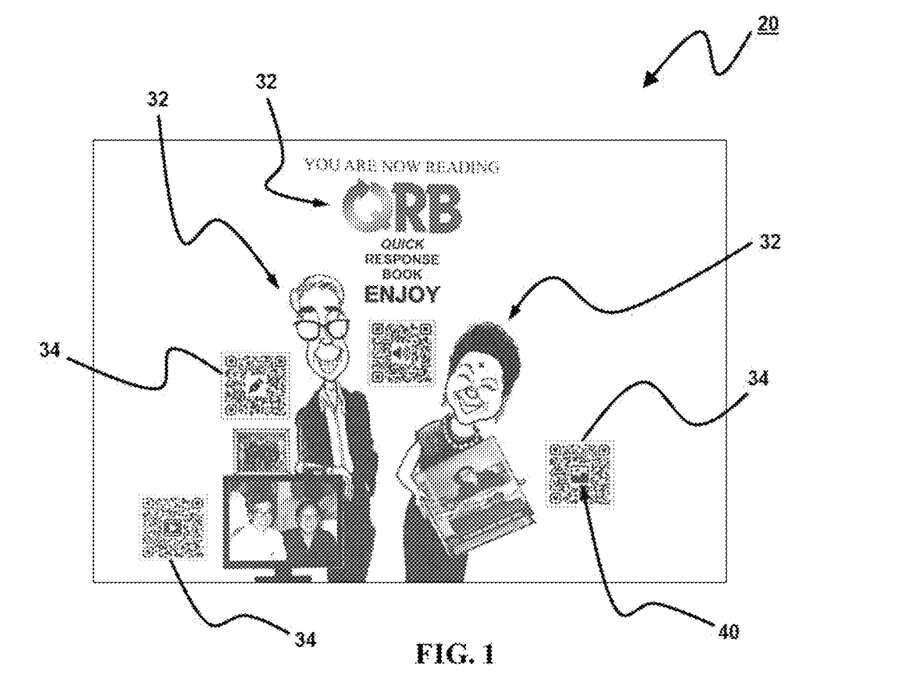
FIG. 1 shows an interactive printed publication as an exemplary page of a book according to an aspect of the invention and comprising a plurality of content segments and a plurality of machine readable codes.

Preferably, the interactive printed publication 20 is one of a book, a pamphlet, a codex, a poster and a sheaf of paper. Further, each of the plurality of machine readable codes 34 is one of a QR code, a 1D barcode, a 2D barcode and a 3D barcode while each of the plurality of content segments 32 containing at least one of words, drawings, pictures and graphical markings. For example, the interactive printed publication 20 can be a book having at least one page thereof containing a series of caricatures constituting one of the plurality of content segments 32 and further having disposed adjacent the caricatures one or more QR codes constituting one or more of the plurality of machine readable codes 34. The arrangement of the caricatures and QR codes associated with their respective caricatures within the book can also be referred to as a book format, a QR book format or a QRB format.

Figure 2:
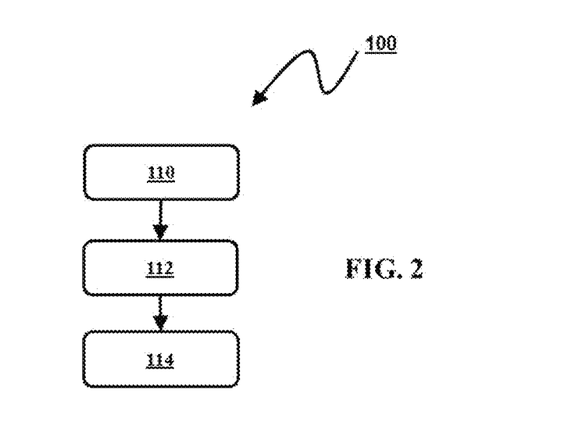
FIG. 2 shows a process flow diagram of a content communication method according to another aspect of the invention for implementing the interactive printed publication of FIG. 2.

In utilizing the interactive printed publication 20 for forming the content communication system 200 and with reference to FIG. 2, the content communication method 100 initiates by providing or making available the interactive printed publication 20 in a step 110. Next, one of the plurality of machine readable codes 34 is read by the image capture means of the computing device 22 in a step 112 for extracting data therefrom. As the data will point towards or identify the computing system 24 for communication with or how the computing system 24 is to be identified, for example a URL and/or an IP (internet protocol) address, communication between the computing device 22 and the computing system 24 is initiated in a step 114.

Figure 4:
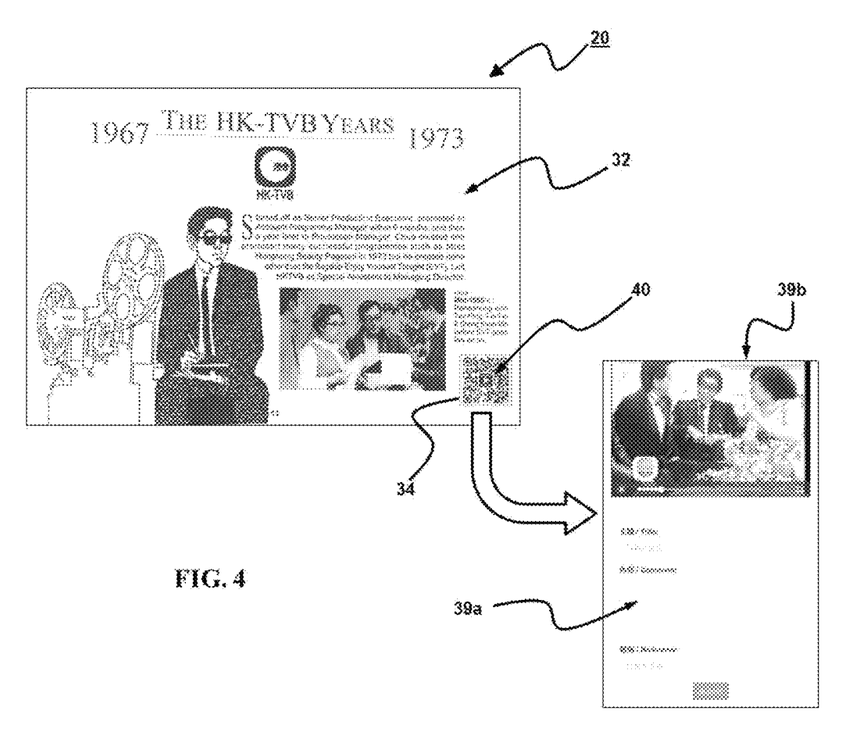
FIG. 4 shows an exemplary page of the interactive printed publication of FIG. 1 with the machine readable code initiating communication through delivery of video stream media content and a form for capturing feedback and comments from a user presented on the computing device of FIG. 3.
Figure 5:
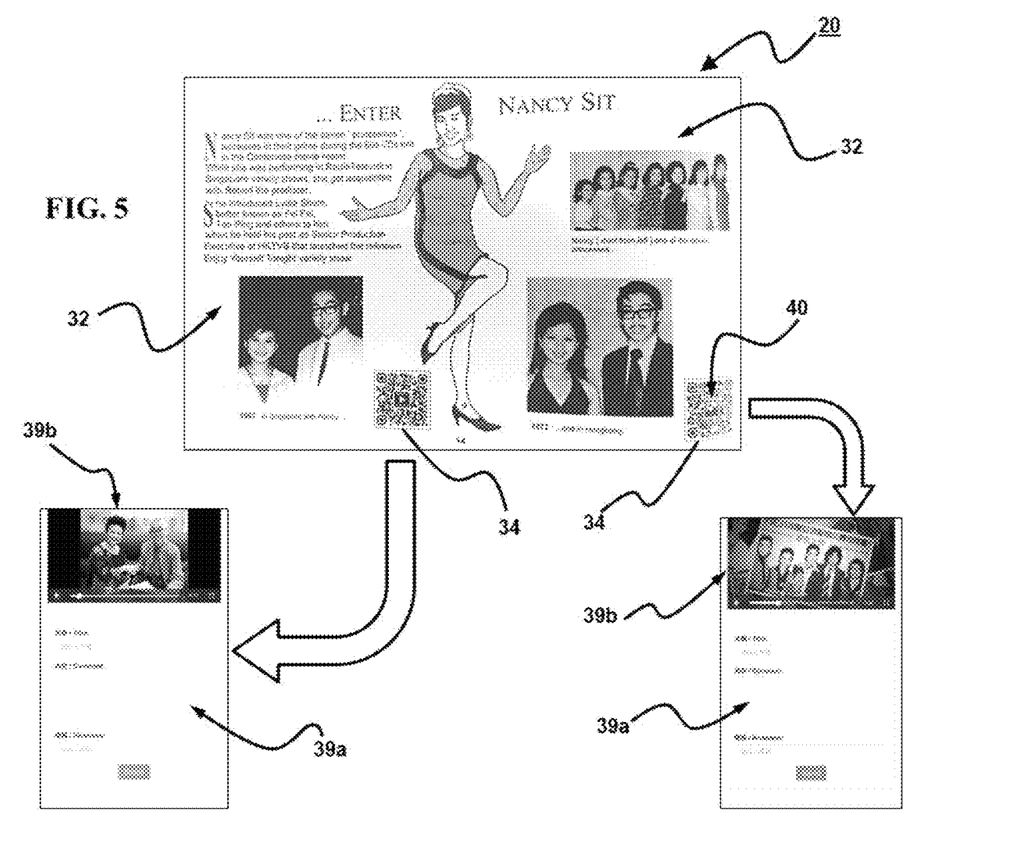
FIG. 5 shows an exemplary page of the interactive printed publication of FIG. 1 with one machine readable code initiating communication through delivery of video stream media content and a form for capturing feedback and comments from a user and another machine readable code initiating communication through delivery of video stream of picture media content and a form for capturing feedback and comments from a user presented on the computing device of FIG. 3.
Figure 6:
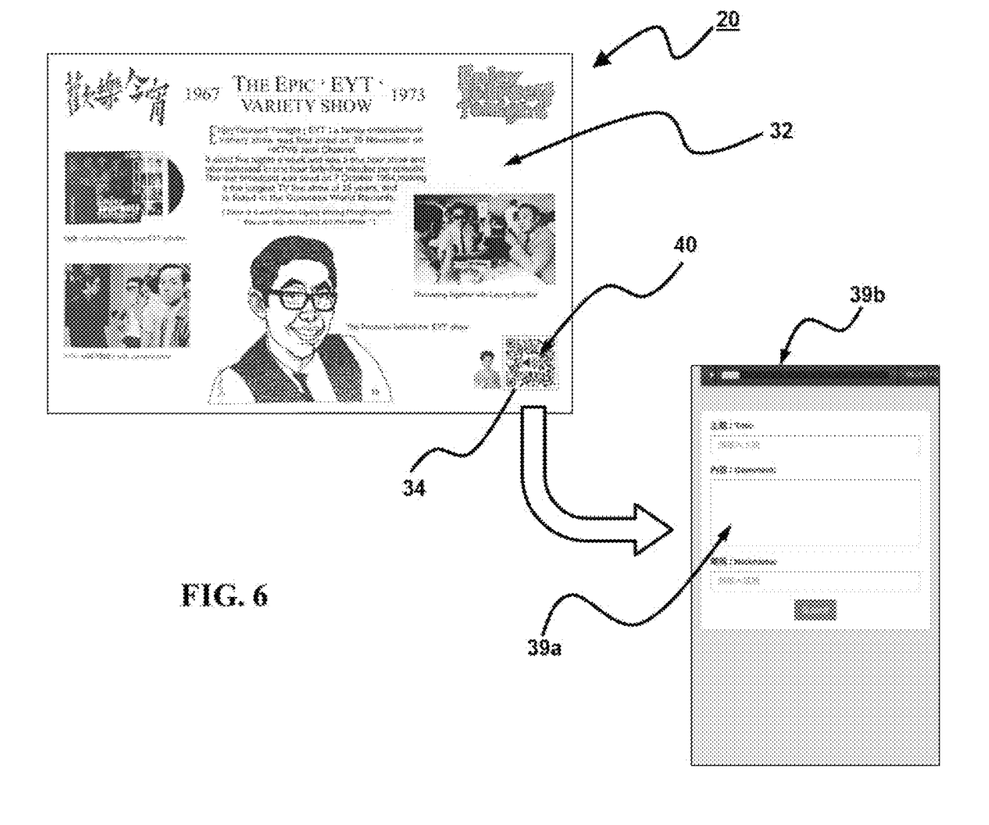
FIG. 6 shows an exemplary page of the interactive printed publication of FIG. 1 with the machine readable code initiating communication through delivery of voice recording media content and a form for capturing feedback and comments from a user presented on the computing device of FIG. 3.
Figure 7:
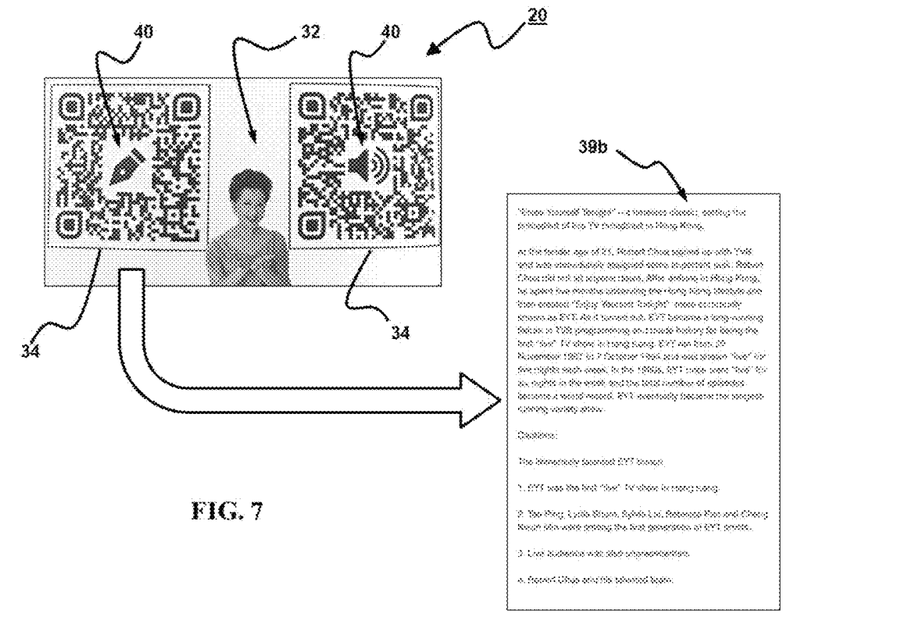
FIG. 7 shows an exemplary page of the interactive printed publication of FIG. 1 with the machine readable code initiating communication through delivery of textual content via the computing device of FIG. 3.
Figure 8:
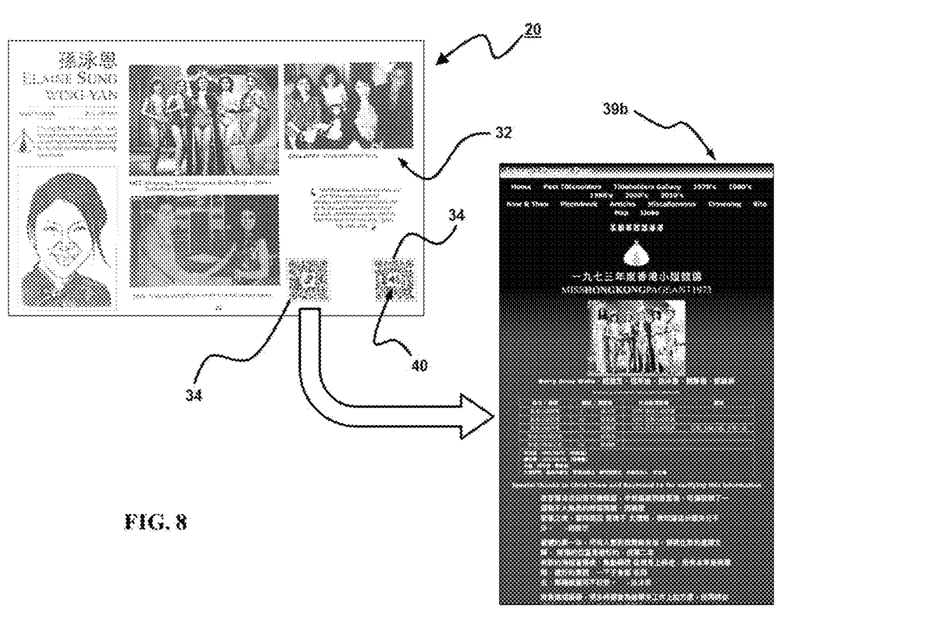
FIG. 8 shows an exemplary page of the interactive printed publication of FIG. 1 with the machine readable code initiating communication through delivery of web page/internet content presented on the computing device of FIG. 3.

Referring to FIG. 4 to FIG. 6, the step 114 of initiating communication between the computing device 22 and the computing system 24 comprises delivery of data, or content, captured by the computing device 22 to the computing system 24. Data delivery can comprise providing a form 39a from the computing system 24 by the computing system to enable capture of form inputs, or input data from the various field within the form 39a, from a user interacting with the computing device 22. The form 39a presented to the user for inputs on the computing device can be a feedback or comments form 39*a* or capturing feedback or comments to one of the plurality of content segment 32 associated with spatially adjacent the respective one of the plurality of machine readable codes 34 that have been read by the computing device 20.

The form 39*a* can be presented in an app natively, via a web browser or has a hybrid instance, independently or together with one or more media content 39*b* like, for example, a video stream, a textual article and/or a VR scene of a modelled scene or a scene captured with a VR camera or a 360 camera. The form 39*a* can also be an interface for composing an email for sending to a specific email address as specified by the corresponding machine readable code 34. Once the comments, i.e. the data, have been captured from the user, the comments are sent back to the computing system 24 preferably together with other information capture from the user or the computing device 22 during interaction therewith, for example, the time and date the comments are captured, the user's identifier (ID) and/or profile, the location of the computing device 22 and/or the IP address of the computing device and the particular caricature or one of the plurality of content segments 32 the capture comments or data is intended for. To achieve the latter, each of the plurality of content segments 32 will have a unique identifier which is associated with, for example by a look-up table residing, for example on the computing system 24, one or more of the plurality of machine readable codes 34.

The step 114 of initiating communication between the computing device 22 and the computing system 24 alternatively or additionally comprises initiating one of voice and video conference between the computing system 24 and the computer device 22. For example, the step 114 will initiate a voice or video conference between the computing system 24 and the computer device 22 on Skype, Viber, WeChat, SnapChat, Cisco WebEx or Google Hangout. It is noted that the computing system needs to be manned by a respondent for a voice or video conference to occur for the user of the computing device 22. Therefore, in order for continuous availability for voice or video conference, the computer system 24 may monitor availability of a group of respondents on their respective communication devices and will direct the voice or video conference call initiated in the step 114 to the next available respondent's device based on a pre-determined sequence should one or another of the respondents be unavailable to take the call. The computing system 24 may initiate voice or video recording, or provide an option to switch to voice or video recording, should one or all of the respondents are unavailable. In addition or alternatively, voice communication can also be initiated between the computing device 22 and an interactive voice responder (IVR) on or directed to by the computing system 24. Management of how the voice or video conference call may be directed is preferably in conjunction with an application, native or hybrid, residing on the computing system 24, or another computing device held by the respondent which forms the computing system or with which the voice or video conference call is to be initiated with, which will also enable the respondent to toggle between availability status, for example "available" and "unavailable" status.

The step 114 of initiating communication between the computing device 22 and the computing system 24 alternative or additionally comprises delivery of at least one of virtual reality (VR), augmented reality (AR), 360 picture, 360 video, 2D picture, 2D video, 3D picture and 3D video content to the computing device by the computing system. AR contents, when delivered from the computing system 24 to the computing device 22 is for augmenting with a real world scene captured by the imaging means of the computing device 22.

For example, AR content comprising an image of a famous personality may be delivered to the computing device 22 for augmenting with a scene captured on the computing device 22 to enable the user of the computing device 22 to "take-a-wefie" with the famous personality. It is preferred that an AR scene generated on the computing system 22 with AR content received from the computing system 24 is communicated back to the computing system 24. As most smart and mobile device, being examples of the computing device 22, are to be developed with AR capabilities with industry leaders such as Apple and Google and Microsoft releasing software development kits (SDKs) for developers to create AR-based apps, the use of the machine readable codes 34 in the interactive printed publication 20, and consequently the content communication system 200, will enable user to directly associate and trigger content communication with AR content as and when needed, thereby enabling the configuration of the interactive printed publication 20 of the adjacently inter-disposed plurality of content segments 32 and plurality of machine readable codes 34 to enable content communication on demand, for example AR content communication on demand.

Examples of the 360, also known as 360 degrees, pictures and videos may be delivered through various platforms such as Detu, Gear 360 or facebook using a pre-stitched scene or video captured from a dedicated 360 camera or from an array of wide-angle or regular cameras like a GoPro camera array. The 2D video content may be delivered through platforms such as Vimeo or YouTube. For example, when the QR code, being one of the plurality of machine readable codes 34, disposed adjacent a caricature or picture, being one of the plurality of content segments 32, of a famous TV personality, will contain data that when scanned and extracted by the computing system 22, will direct and initiate communication with and for enabling a video of the TV personality singing, may be streamed to the computing device 22 by the computing system. The video of the TV personality singing may also be available on platforms such as YouTube to which the computing system 24 may direct or whereto the data extracted from the scanned QR code may direct.

As it is difficult to interpret the data from the machine readable code 34 without the use of the computing device 22, a plurality of icons 40, each graphically indicating the type of communication that is to be initiated thereby, may be incorporated with the machine readable code 34, for example by graphically embellishing a small segment of the center of the QR code. The icon will have, for example an outline of a nib of a fountain pen to represent communication to enable provision of comments to the computing system 24 using the computing device 22 on a picture, caricature or words on the interactive printed publication 20, while a symbol of a "Play" button will indicate streaming of a video or voice recording from the computing system 24 or from a video hosting platform like YouTube.

With the foregoing method 100 and system for content delivery, data and information relating to the communication between the computing device 22 and the computing system 24 through the use of the interactive printed publication 20 can be captured, tracked and analysed. Various analytics can also be performed on the data generated from the content communication wherefrom meaningful analytics can be derived.

With the foregoing disclosure of the interactive printed publication 20 constituting the content communication system 200 and performed via the content communication method 200, the simple printed publication or books which has traditionally allowed only a single directional content delivery from publisher/author to the reader has now been enabled with bi-directional communication to and from both the user/reader of the publication/book to the publisher/author thereof.

Further, the implementation of the interactive printed publication 20 in the form of a book, also referred to as a QRB, via the content communication system 200, also referred to as a QRB platform, is to create a new industry standard protocol to offer an affordable solution to traditional publisher and to enable production of electronic content based on barcode or geometry, constituting the plurality of machine readable codes 34, in an AR scene.

Further, a QRB protocol through the mix of QR Codes, constituting the plurality of machine readable code 34 associated with the respective one or more of the plurality of content segments 32, and AR technology, enables the integration of a series of utilities to automatically decode content for AR or initial communication between publisher and end-users of the QRB without privacy trade-off. The QRB and QRB protocol will fully utilise all mobile's built-in cameras (for capturing the machine readable codes 34), and do not require extra download or install extra software Apps, with the mobile device (i.e. the computing device 22) working with the QRB out of the box.

Aspects of particular embodiments of the present disclosure address at least one aspect, problem, limitation, and/or disadvantage associated with existing printed publications and content communication systems and methods. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a visitor of ordinary skill in the art that several of the above-disclosed structures, components, or alternatives thereof, can be desirably combined into alternative structures, components, and/or applications. In addition, various modifications, alterations, and/or improvements may be made to various embodiments that are disclosed by a visitor of ordinary skill in the art within the scope of the present disclosure, which is limited only by the following claims.

The invention claimed is:

1. An interactive printed publication comprising:
a plurality of content segments printed thereon;
a plurality of machine readable codes printed thereon, each of the plurality of machine readable codes being associated with and positioned adjacent at least one of the plurality of content segments, each of the plurality of machine readable codes containing data being extractable by a computing device when being read thereby for initiating communication between the computing device and a computing system;
initiating communication between the computing device and a computing system comprising delivery of data captured by the computing device to the computing system;
initiating communication between the computing device and a computing system further comprising providing a form from the computing system by the computing system to enable capture of form inputs from a user interacting with the computing device, the form being a feedback or comments form for capturing feedback or comments to one of the plurality of content segments associated with a respective one of the plurality of machine readable codes;
initiating communication between the computing device and a computing system further comprising communicating at least one of location data, internet protocol (IP) address, user data of the user of the computing device and device data of the computing device to the computing system; and
each of the plurality of machine readable codes comprising an icon for graphically indicating a type of the communication that is to be initiated.

2. The interactive printed publication as in claim 1, each of the plurality of machine readable codes being one of a QR code, a 1D barcode, a 2D barcode and a 3D barcode.

3. The interactive printed publication as in claim 1, wherein the interactive printed publication is one of a book, a codex, a poster and a sheaf of paper.

4. The interactive printed publication as in claim 1, wherein initiating communication between the computing device and a computing system further comprises initiating one of voice and video conference between the computing system and the computer device.

5. The interactive printed publication as in claim 1, wherein initiating communication between the computing device and a computing system further comprises delivery of at least one of virtual reality (VR), augmented reality (AR), 360 picture, 360 video, 2D picture, 2D video, 3D picture and 3D video content to the computing device by the computing system.

6. The interactive printed publication as in claim 5, wherein an AR scene generated on the computing system with AR content received from the computing system is communicated to the computing system.

7. The interactive printed publication as in claim 1, the computing device being one of a smart phone, a smart tablet and a notebook computer and each of the plurality of content segments containing at least one of words, drawings, pictures and graphical markings.

8. A content communication method comprising:
providing a printed publication comprising:
a plurality of content segments printed thereon; and
a plurality of machine readable codes printed thereon, each of the plurality of machine readable codes being associated with and positioned adjacent at least one of the plurality of content segments, each of the plurality of machine readable codes containing data being extractable by a computing device when being read thereby, and
reading one of the plurality of machine readable codes for extracting data therefrom for initiating communication between the computing device and a computing system therewith,
wherein initiating communication between the computing device and a computing system comprises delivery of data captured by the computing device to the computing system, wherein initiating communication between the computing device and a computing system further comprises providing a form from the computing system by the computing system to enable capture of form inputs from a user interacting with the computing device, the form being a feedback or comments form for capturing feedback or comments to one of the plurality of content segments associated with a respective one of the plurality of machine readable codes, wherein initiating communication between the computing device and a computing system further comprises communicating at least one of location data, internet protocol (IP) address, user data of the user of the computing device and device data of the computing device to the computing system, and wherein each of the plurality of machine readable codes comprises an icon for graphically indicating a type of the communication that is to be initiated.

9. The content communication method as in claim 8, each of the plurality of machine readable codes being one of a QR code, a 1D barcode, a 2D barcode and a 3D barcode.

10. The content communication method as in claim 8, wherein the interactive printed publication is one of a book, a codex, a poster and a sheaf of paper.

11. The content communication method as in claim 8, wherein initiating communication between the computing device and a computing system further comprises initiating one of voice and video conference between the computing system and the computer device.

12. The content communication method as in claim 8, wherein initiating communication between the computing device and a computing system further comprises delivery of at least one of virtual reality (VR), augmented reality (AR), 360 picture, 360 video, 2D picture, 2D video, 3D picture and 3D video content to the computing device by the computing system.

13. The content communication method as in claim 12, wherein an AR scene generated on the computing system with AR content received from the computing system is communicated to the computing system.

14. The content communication method as in claim 8, the computing device being one of a smart phone, a smart tablet and a notebook computer and each of the plurality of content segments containing at least one of words, drawings, pictures and graphical markings.

15. A content communication system comprising:
an interactive printed publication comprising:
　a plurality of content segments printed thereon; and
　a plurality of machine readable codes printed thereon, each of the plurality of machine readable codes being associated with and positioned adjacent at least one of the plurality of content segments; and
a computing device for reading and extracting data from a selected one of the plurality of machine readable codes to thereby initiate communication between the computing device and a computing system,
wherein the communication between the computing device and the computing system comprises delivery of data captured by the computing device to the computing system, wherein the communication between the computing device and the computing system further comprises providing a form from the computing system by the computing system to enable capture of form inputs from a user interacting with the computing device, the form being a feedback or comments form for capturing feedback or comments to one of the plurality of content segments associated with a respective one of the plurality of machine readable codes, wherein initiating communication between the computing device and a computing system further comprises communicating at least one of location data, internet protocol (IP) address, user data of the user of the computing device and device data of the computing device to the computing system, and wherein each of the plurality of machine readable codes comprises an icon for graphically indicating a type of the communication that is to be initiated.

* * * * *